United States Patent [19]

Sclippa

[11] 4,218,944
[45] Aug. 26, 1980

[54] ROTARY KNIVES SHEAR MACHINE

[76] Inventor: Ferruccio Sclippa, Via Matteotti n.57, Tricesimo (UD), Italy, 33019

[21] Appl. No.: 890,072

[22] Filed: Mar. 27, 1978

[51] Int. Cl.² .............................................. B23D 25/08
[52] U.S. Cl. ........................................ 83/345; 83/328; 83/305; 83/321; 83/285
[58] Field of Search .................. 83/345, 305, 285, 337, 83/343, 321, 327, 329, 328

[56] References Cited

U.S. PATENT DOCUMENTS

| | | | |
|---|---|---|---|
| 1,140,392 | 5/1915 | Novick | 83/328 |
| 1,989,012 | 1/1935 | Kalko | 83/328 |
| 3,886,830 | 6/1975 | Holthoff et al. | 83/328 |

FOREIGN PATENT DOCUMENTS 644147 8/1962 Italy ............................................ 83/328

*Primary Examiner*—Donald R. Schran

[57] ABSTRACT

Improvements relating to shear machines to cut advancing bars and particularly a rotary knives dividing shears cutting device, wherein one improvement relates to the conversion of a conventional rotary knives shear machine to a planetary rotary knives shear machine, working at a multiple ratio high speed, the other improvement provides planetary rotary knives working at a fractional ratio in order to keep the rotating knives always directed in the same shear direction.

6 Claims, 11 Drawing Figures

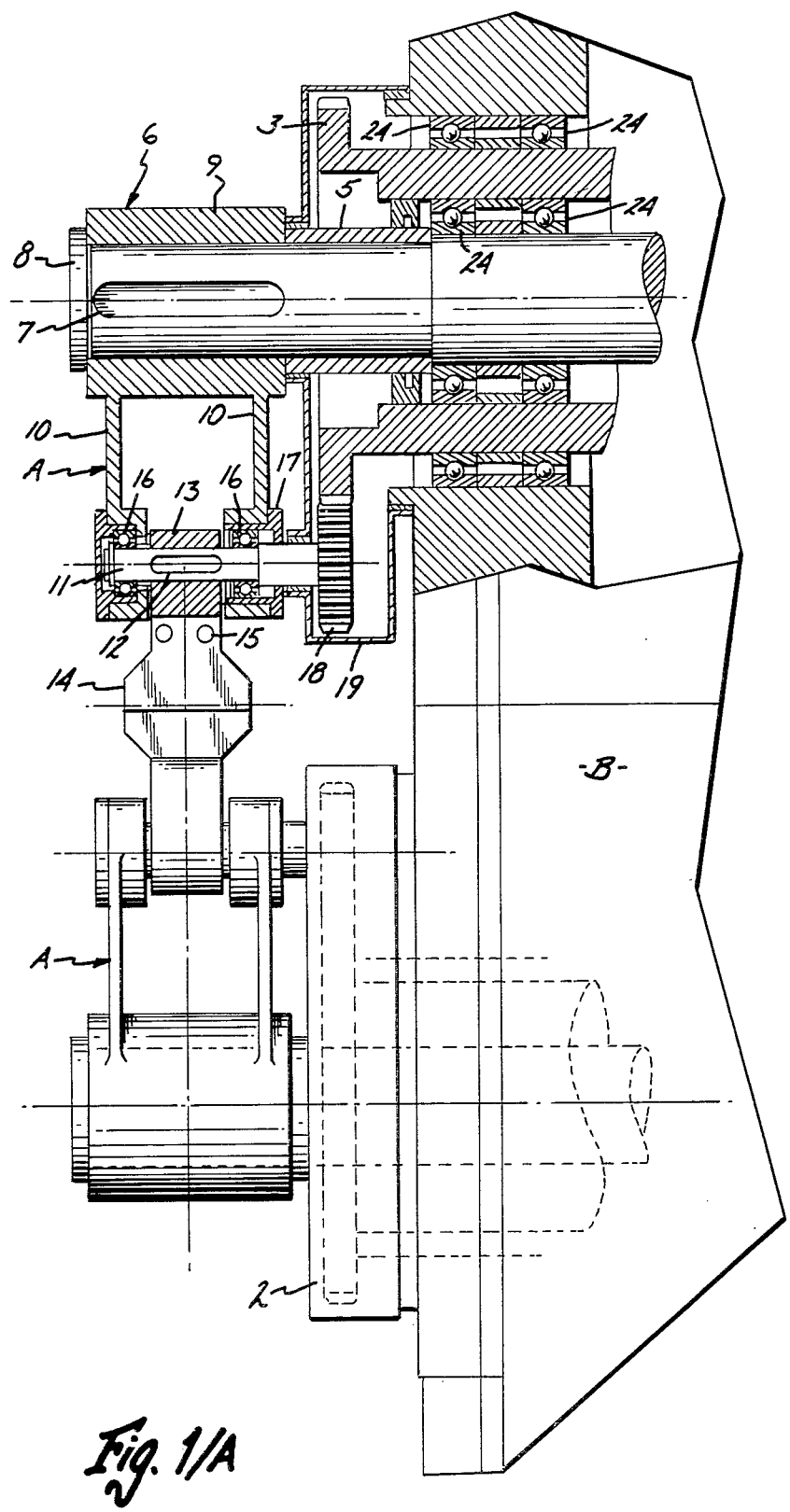
Fig. 1/A

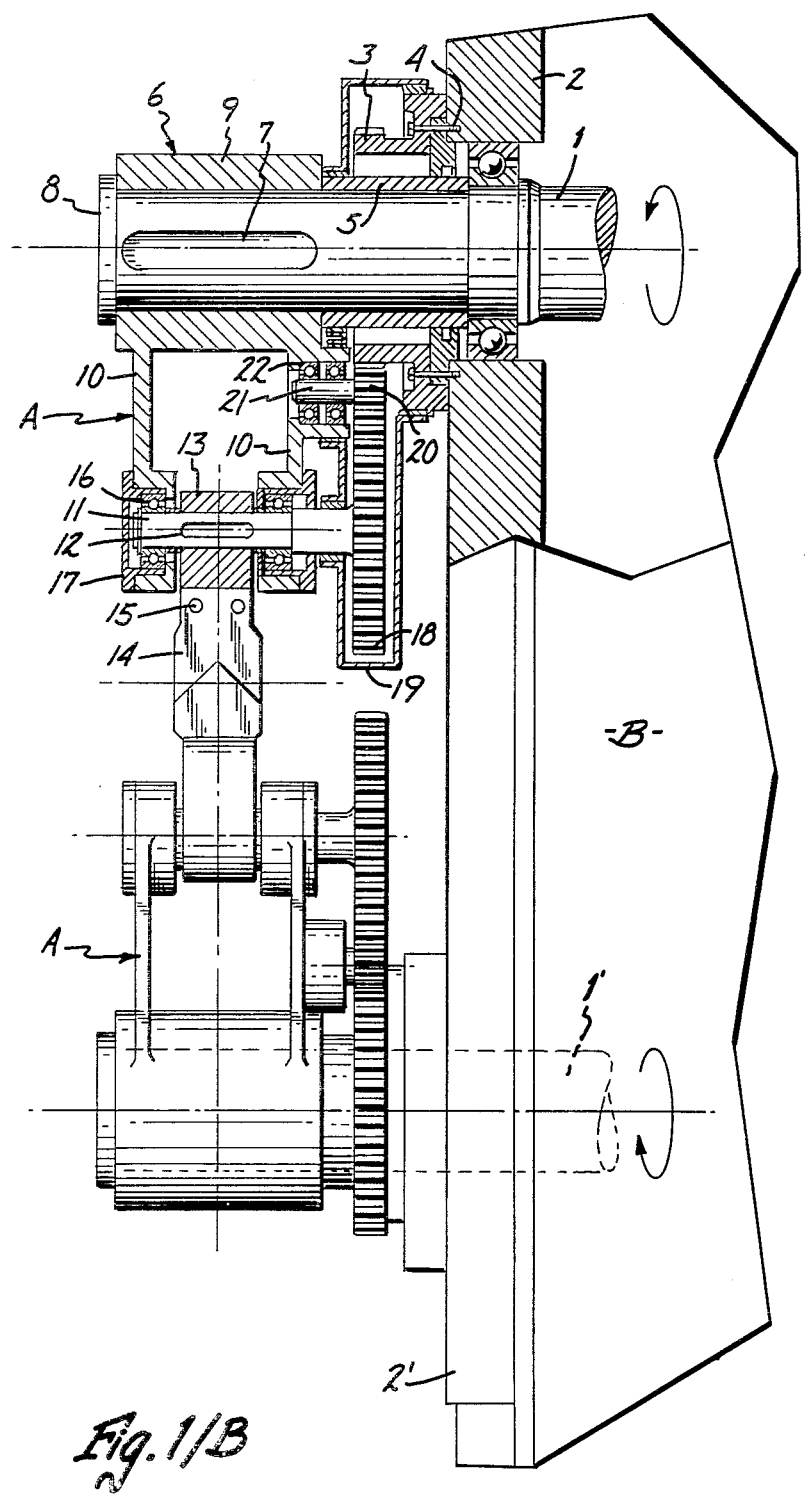
Fig.1/B

Fig. 2/A

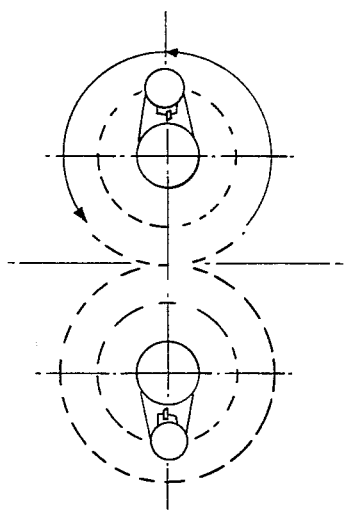
Fig.2/B
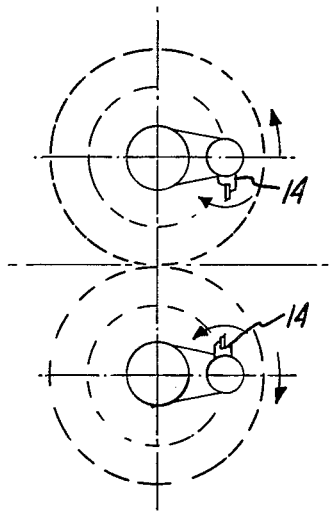
Fig.3/B
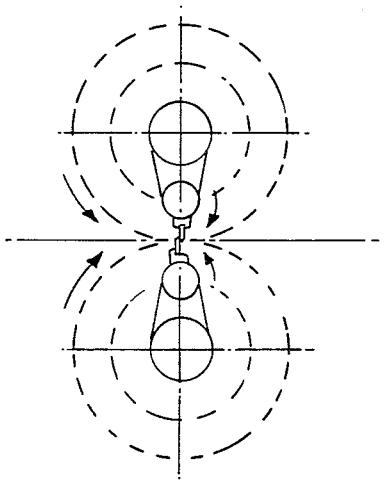
Fig.4/B

ROTARY KNIVES SHEAR MACHINE

BACKGROUND OF THE INVENTION

This invention relates to improvements for rotary knives shearing machines and more particularly a rotating knives dividing shears cutting device, to cut bars which are advancing at a very high speed.

In the prior art, the problem of designing a device for cutting and separating bar stock coming from a rolling mill or some other place and which is advancing at a very high speed, is very well known.

In the prior art, particularly for rolling equipment, the need to develop a device to cut such advancing bar stock is very urgently felt, because there is an obvious need to improve the speed characteristics of such equipment.

It is known, that the basic problem which prevents the increase of the working speed of this type of equipment, is one concerning the crop cutting of the bars and/or their cutting to length, and to separate the advancing bars. This problem is not only related to bar cutting equipment, but also relates to similar equipment such as wire-manufacturing equipment.

The limitation of the maximum speed of the presently used rotary side-trimming shears depends on the fact, that these shearing machines work rhythmically which means that the knives are held firm in a waiting area of non interference with the passage of the bar, and they accelerate on a predetermined signal and with a peripheral speed equal to the one for the advancement of the bar they are to cut. These machines then decelerate and stop again at a dead waiting point, and then start again for a new cut and so on. This solution is based on the actual need to effect the cut of the bar at the chosen moment and at the chosen point. This technique actually employs practically exclusively various types of rotating knives. Other types are not very often in use, because they are too expensive and mostly not very practical.

These first types of rotating knives comprise generally an electric motor connected to a continuously rotating flywheel from which, with the use of a clutch, the motion is immediately transmitted to the rotating knives for the cut, and then with the utilization of a brake they are brought into a waiting position at the said dead point. This may also be achieved with an improved apparatus, including a collateral motor for the replacement of the phase and with a collateral clutch means, as for instance described in the Italian patent application of the same inventor, registered in Italy on Jan. 15, 1977, under Nr. 83307 A/77, where among others a particular way of operating is described to establish the dead point immediately downstream of the cutting area.

The present invention provides a solution which employs high speed for the above-mentioned purpose, but with the use of special devices in the areas for acceleration and deceleration of the knives, and consequently for the selection of the dead point between each new cut.

However, it is well known that merely increasing the peripheral speed of the knives has practical limits, depending on the loading caused by violent accelerations and decelerations. Therefore if one intends to increase the speed, the problems associated with the above-described constructive schemes are so difficult as to discourage attempts at building shearing machines of this type with increased speed. The choice for the inventor is therefore based in the first instance on the research for a solution which allows both an increase of the peripheral speed of the knife and more control over the inertia of the rotating mass, even if this requires an increase in power or energy use, for instance because of higher frictions, which would only require an increase for the transmission and a drive motor with very high power. In the second instance the choice for the inventor is based on the research for a solution which achieves an improved cutting operation.

SUMMARY OF THE INVENTION

The present invention consists of a new rotating knives device, where two opposed knives are mounted and driven by a planetary gear connected to a knife carrying shaft, which planetary gear is driven about a central gear or toothwheel by a second shaft which may form a part of a conventional shearing machine.

In the preferred embodiment, the rotating knife turns about an axis on the end of an arm which rotates as well about a parallel axis, with the characteristics that both rotations occur in the same direction. In other words, both rotate clockwise at the same time and counterclockwise at the same time, and therefore the knife edge moves according to an epicycloid trajectory.

It appears immediately that according to this combination the importance of the rotating mass inertia is reduced in comparison to a simple rotating system in which the same peripheral speed is achieved. This is because the knife edge traces a larger effective radius for the same drive shaft angular rotation, and therefore achieves higher peripheral speeds with lower inertial mass.

In accordance with the present invention one segment of the rotating mass is not always at a constant distance from the main central rotation axis, but this mass segment is displaced alternately towards the periphery and towards the center of rotation. By comparison, the inertial mass of a conventional system relates to a rotating radius, generally equivalent to the distance between the two rotation centers, with the additional advantage with the present invention having the cut executed only at the precise moment when the maximum peripheral speed of the cutting edge of the knife is achieved, which means to say, at the precise moment when the knife edge is at the maximum distance from the principal central axis of rotation (center of the epicycloid).

According to a second embodiment of the invention, it is possible to align a pair of opposed rotating knives in a manner so they will always be orientated in the direction of the cut, perpendicular to the bar to be cut. This embodiment is achieved by a special gear-ratio to the planetary gear and more particularly by inserting a pinion or third gear between a central gear and the planetary gear.

The device therefore includes the knife which is keyed to a toothed wheel, which in turn rotates as a planet wheel geared to a principal driving central toothed wheel, coaxially to the central principal axis of the system, with the use of a carrying shaft which rotates around the said central principal axis.

The principal or driving toothed wheel, according to the present invention, in a more simplified way, may be keyed on or attached to the machine frame or may also be fitted rotating in an independent manner so as to become the drive wheel. In the first case, (drive wheel firm) if (R) is the median radius of the principal wheel, (r) is the radius of the planet wheel and $V_1=rW''$ is the peripheral speed of the rotating peripheral center of the planet wheel and consequently of the respective axis of the keyed-on knife, it can be shown that the relative angular speed of the knife of the planet wheel is $W''=V_1/r$ and the arm carrying the axis of the planet wheel and the knife, in this specific case will be $W'=(V_1/R+r)$.

If the arm of the knife is equal to (r), the thread cuts with a rotating radius instantaneously with regard to the principal axis equal to $(R+2r)$ identifying itself in the ordinary epicycloid. In this case, a comparison in parity to the angular rotation of the knife carrying arm with a conventional system would come out:

-with the conventional solution a speed $V_2=W'(R+2r)$,

-with the solution of the present invention a speed in the specific case of ordinary epicycloid from the point to the distance $(R+2r)$ at the moment of the cut being the peripheral rotating speed of the knife in the periphery with regard to the peripheral center of $V_1$:

$$V_3=2rW''=2V_1=2W'(R+r)=W'(2R+2r)$$

therefore if the radii are equal $(R=r)$ it would be an increase of the speed equal to:

$$\Delta V = \frac{V_3}{V_2} = \frac{4}{3}$$

equal to 33.3%. With the hypothesis of $(R<r)$, there would be a progressive reduction until arriving at the value of $V_2=V_3$. With the preferred hypothesis of $(R>r)$, there would be an increase greater than 33.3% in comparison to the conventional approach. Therefore, for instance with $(R=2r)$, there would be an increase in speed of 50%; and with $(R=3r)$ there would be an increase in speed of 60%; and with $(R=4r)$ an increase of 66.6%. Therefore, with the limit of $r > o$ it would result in an increase of 100%, corresponding to doubling the speed from the conventional approach. However, remaining within the practical terms an increase of the speed around the values of 50% is very acceptable.

This preferred radius may result in a bigger rotary radius of the knife than the planet wheel and therefore a longer epicycloidal motion will be obtained, which will further increase the instantaneous cutting speed of the knife. For instance, in the case of $(R=4r)$, with an extension of the knife arm of 1:3 would result in:

$$V_2 = W'(R+4r)=8rW'$$

$$V_3=4rW''=4V_1=4W'(R=r)=20rW',$$

therefore the increase of the speed would be:

$$V = \frac{V_3}{V_2} = \frac{20}{8} = 2.5$$

equal to an increased speed of 150%, which would mean that the knives operate the cut with a speed more than double the one with respect to the angular speed of the knife carrying arm with respect to the principal axis.

Furthermore, it should be noted that the transmission joint between the toothed wheels is carried out in such a way, that the knives for one or more turns do not meet each other and for one turn they cross and frictionally cut the bar.

Otherwise in the second case of rotation the drive wheel, if it remains firm, replaces or displaces the phase of knives which in this manner may continue to rotate with the principal shaft, allowing or preventing the cut of the bar, or otherwise if the drive wheel alternates its acceleration or deceleration speed achieves the said needed replacement or displacement of the phase.

BRIEF DESCRIPTION OF THE DRAWINGS

The invention will be better understood with the aid of the following particular description of an example of a preferred embodiment, wherein the device includes a firm toothed wheel coaxial to the axis of the keying of the rotating knife carrying arm, and the knife has an arm which is longer than the radius of the planet wheel to which end it is connected, and with reference to the appended drawings, in which:

FIG. 1A shows a variation of FIG. 1 with a rotating or rotary drive wheel;

FIG. 1B shows a variation of FIGS. 1 and 1A of a second embodiment;

FIGS. 2', 2/A, 3' show a variation of the schematic of FIGS. 2 and 3, according to the solution of FIG. 1.

FIGS. 2/B, 3/B and 4/B show a schematic of the operating motion of the knives according to the device of FIG. 1/B.

DESCRIPTION OF THE PREFERRED EMBODIMENT

Figure 1:
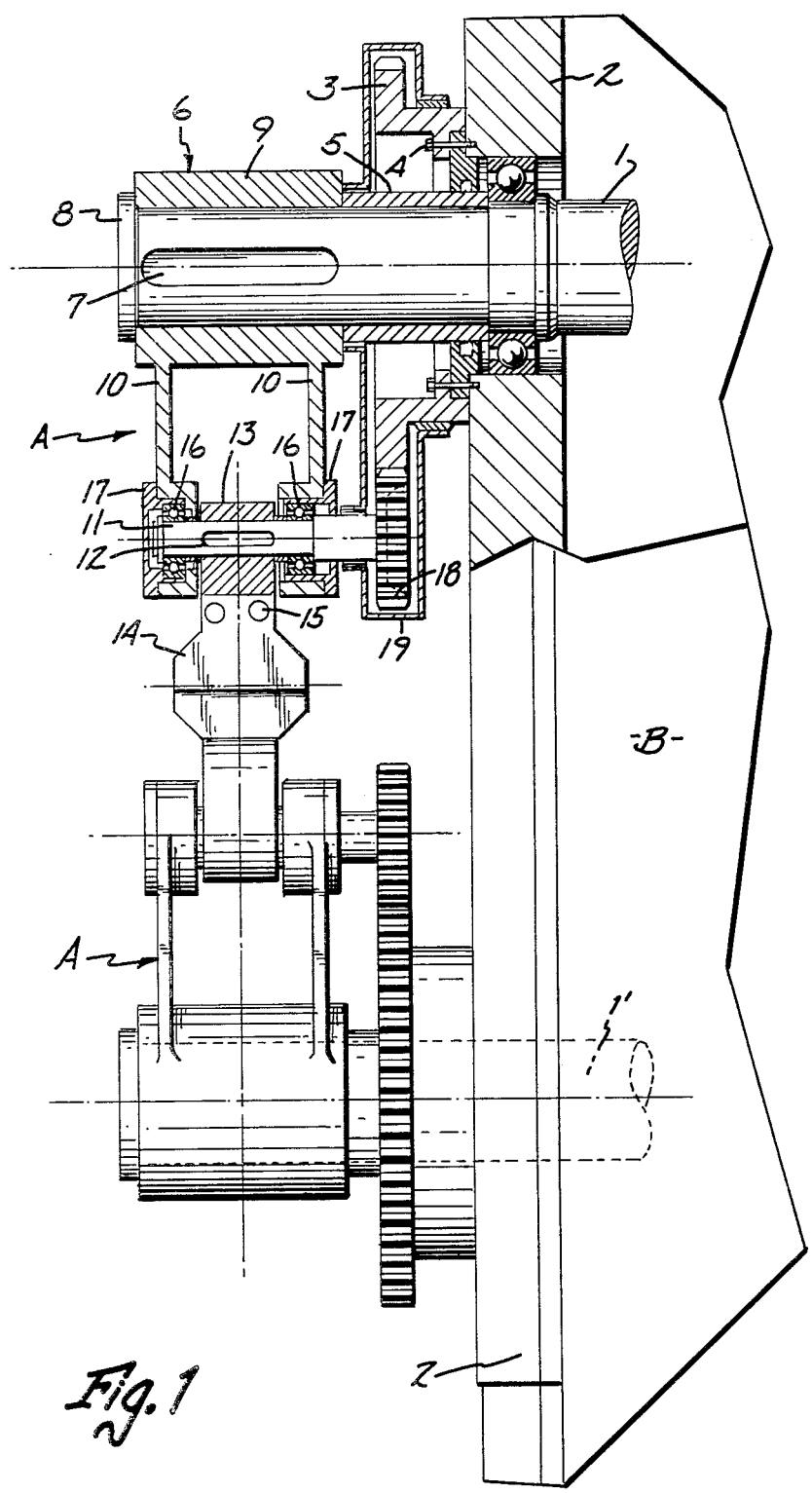
FIG. 1 shows a side view in partial cross section along the vertical plane of a shearing machine.
Figure 2:
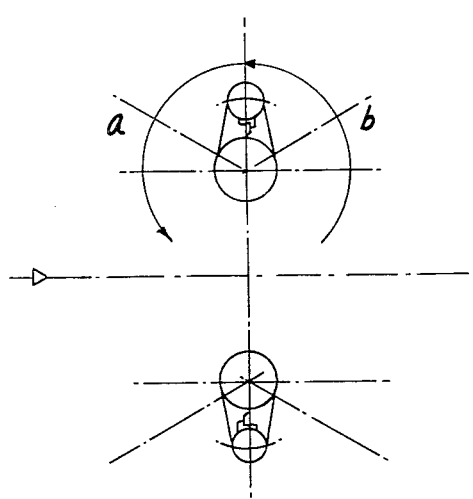
FIGS. 2 and 3 show a schematic front view of the operating motion of the knives according to the utilization shown in FIG. 1.
Figure 3:
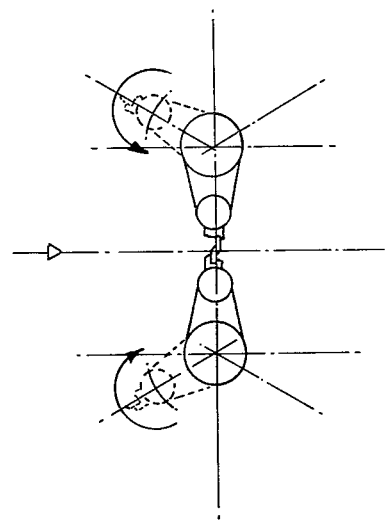
Figure 2:
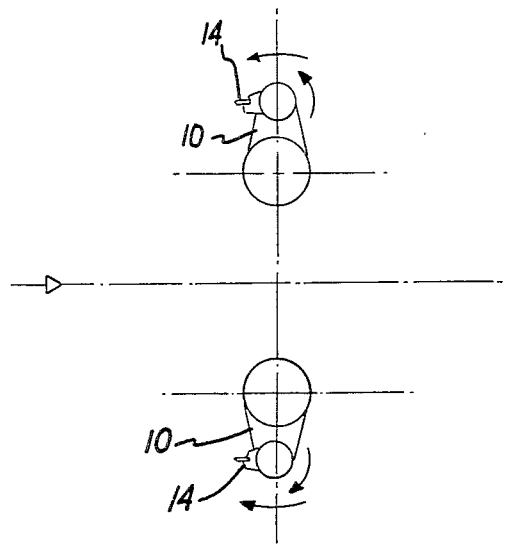
Figure 3:
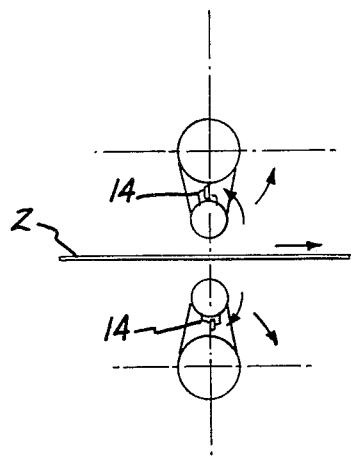
Figure 3:
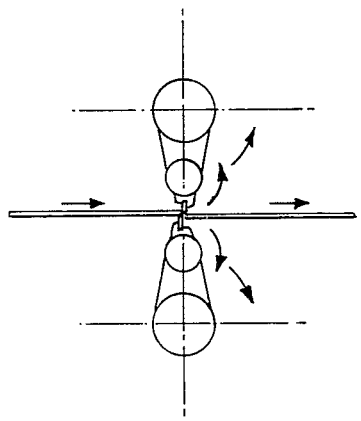

From the FIGS. 1, 2, 3, 2', 2/A, 3' it can be seen that the machine consists of a shearing body B of the conventional type having two projecting rotary drive shafts 1 and 1', and having supported on each drive shaft a cutting device A according to the invention.

The two shafts 1 and 1' rotate at the same rate of speed, one respectively in the clockwise direction, the other one in the counter clockwise direction, being driven by any well known technique. The shearing machine includes also a mounting crankcase, which in this specific case is formed of two pieces, one as a cover 2 the other as a base 2' which supports the respective shafts 1 and 1'. The cutting devices A are coaxially mounted to the shafts 1 and 1', which devices include a toothed wheel or gear 3, installed by way of a round-shouldered flange to the machine frame 2 and 2' with screws 4 and by way of a spacer 5 the arm 6 is keyed to the shaft 1 and 1' with the key 7. It is kept locked to the shaft by means of the shoulder flange 8 which is screwed to the end of the shaft 1 (screws not illustrated).

The arm 6 consists of a sleeve 9 with two normal plates 10 forming a fork or a bridge, which together really form part of the arm itself. The ends of plates 10 are adapted for receiving a rotatable shaft 11 which supports mortised with the key 12 a knife carrier 13 in the arm to which the knife 14 is screwed on with the screws 15.

The shaft 11 is mounted on bushings 16 held by eccentric flanges 17 for the recovery of the clearances, tightened to the plates 10 which form the principal arm. The shaft 11 protrudes axially to the inside of the machine crankcase 19 and has attached to its inner end the planet gear 18 which is geared to the gear 3. Both gear 3 and gear 18 are covered with the protective crankcase 19.

In this specific case it can be seen that the planet gear 18 has a diameter smaller than the diameter of the gear 3. The device mounted to shaft 1' is identically constructed to the above described device, the only difference being that it rotates in the opposite direction.

FIGS. 2 and 3 show the respective phases of the superior dead waiting point and the cutting phase, with the cutting phase outlined in intermediate position on the acceleration arc "a" in FIG. 2, wherein "a" indicates the acceleration arc and "b" indicates the deceleration arc.

The variation of FIG. 1A shows the utilization of the gear 3 mounted so as to be rotatable and supported by bushings 24 and in this case the shaft 1 drives the gear 3 in an independent manner.

The system is structured in a manner that, in coincidence with the rotation of the principal shaft 1 the arm 6 rotates while the gear 3 for instance remains firm, towing the shaft 11 around the shaft 1, forcing the planet gear 18 to rotate. Therefore the shaft 11 rotates also by itself and forces the knife 14 to rotate, whose cutting-edge completes an epicycloidal motion (in this specific case an extended one), because the cutting arm, formed by the distance between the cutting-edge of the knife 14 and its rotation axis 11, is greater than the respective radius of the planet gear 18, which is situated coaxially to the carrying shaft 11.

The drive gear 3 may naturally also rotate clockwise or counter clockwise, increasing or decreasing the cutting speed of the knives 14. With each variation of the movement of the gear 3 with regard to the shaft 1 results a phase of replacement or a phase of displacement of the knives to effect or not to effect the cut, because of which fact it is not necessary to stop the rotation of the shaft 1 for each cutting cycle.

In the FIGS. 2', 2/A and 3' the relative phase of the knives is shown. In the specific case of FIG. 2/A the phase of displacement of the knives is seen, with one or more turns or idle strokes without cutting the bar, because the knives 14 are rotating outside the cutting area for the bar "z", because of the rotation of the gear 3. FIG. 3' shows the cutting phase because of the variation of the rotation of the gear 3.

In a more simple case the gear 3 may remain fixed, but rotatable over a predetermined angle by way of a servocontrol mechanism, to bring the knives 14 into a cutting position or into a non-cutting position as chosen, and this can be accomplished while the bar advances and without stopping the rotation of the shaft (1).

Naturally the alteration of the cutting turns and the non-cutting turns depends on the program planned for the machine.

In the FIG. 1/B the reversed motion of the planet gear 18 is obtained with a pinion or third gear 20. In the case with the appropriate gear-ratio, the rotating knives will always have the same shearing direction.

It will be understood, that various modifications may be made to the above without departing from the spirit and scope of the invention.

What is claimed is:

1. A shear machine for cutting a bar including at least one pair of principal parallel shafts, which rotate at the same rate in opposite directions, comprising a principal gear fixedly and coaxially mounted about each of said principal shafts; an arm keyed to each of the said principal shafts to rotate therewith; a secondary shaft supported on said arm; a knife attached to said secondary shaft; a secondary gear attached to said secondary shaft and in planetary geared coupling with said principal gear; whereby the rotation of the principal shaft and of the respective arm, the secondary gear rotates, about the principal gear and carries said knife with it by means of said secondary shaft, the cutting motion of said knife being along an epicycloidal trajectory.

2. The shear machine of claim 1, wherein said principal gear has a diameter at least as great as the diameter of said secondary gear.

3. A shear machine, according to claim 2 further comprising a machine body for supporting said principal shafts, and wherein said arm has the form of a fork and supports said secondary shaft around it, and wherein said secondary gear and said principal gear are located between said arm and said machine body.

4. A shear machine according to claim 1, further comprising means for rotating said knives on said secondary shafts so as to bring said knives into cutting position relative to said bar on alternate rotations of said secondary shaft.

5. A shear machine according to claim 4, further comprising an intermediate gear coupled between said principal gear and said secondary gear, said gears having ratios such that said knives move into cutting position at a predetermined multiple of a number of rotations of said principal shaft.

6. The shear machine of claim 1, wherein the epicycloidal trajectory of said knives is selected to permit the cut of said bar at the moment when the cutting edges of said knives are approximately at a maximum distance from their respective principal shafts.

* * * * *